United States Patent
Walker et al.

(10) Patent No.: US 10,475,081 B1
(45) Date of Patent: Nov. 12, 2019

(54) COUPON PROCESSING SYSTEM INCLUDING INSTANT REDEEMABLE COUPON REDEMPTION BASED UPON SHORT MESSAGE SERVICE SHORT CODE AND RELATED METHODS

(71) Applicant: INMAR CLEARING, INC., Winston-Salem, NC (US)

(72) Inventors: Jess D. Walker, Georgetown, TX (US); Bryan Bartow, Leander, TX (US); David E. Johnson, Cedar Park, TX (US); Chris Rebstock, Round Rock, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 109 days.

(21) Appl. No.: 15/712,853

(22) Filed: Sep. 22, 2017

(51) Int. Cl.
*G06Q 30/02* (2012.01)
*G06Q 20/36* (2012.01)
*H04W 4/02* (2018.01)
*G06Q 20/20* (2012.01)

(52) U.S. Cl.
CPC ....... *G06Q 30/0268* (2013.01); *G06Q 20/201* (2013.01); *G06Q 20/36* (2013.01); *G06Q 30/0207* (2013.01); *G06Q 30/0229* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| RE37,166 E | * | 5/2001 | Rando | G06K 7/10871 235/375 |
| 2008/0140520 A1 | * | 6/2008 | Hyder | G06Q 20/342 705/14.1 |
| 2013/0332283 A1 | * | 12/2013 | Faith | G06Q 30/0239 705/14.64 |
| 2014/0180802 A1 | * | 6/2014 | Boal | G06Q 30/0245 705/14.49 |
| 2016/0140594 A1 | * | 5/2016 | Pope | G06Q 30/0222 705/14.23 |

OTHER PUBLICATIONS

Walker et al., U.S. Appl. No. 15/712,690, filed Sep. 22, 2017.

* cited by examiner

*Primary Examiner* — Colleen A Hoar
(74) *Attorney, Agent, or Firm* — Allen, Dyer, Doppelt + Gilchrist, P.A.

(57) ABSTRACT

A coupon processing system may include a promotions server and a mobile wireless communications device associated with a purchaser and having a device identification (ID) associated therewith. The mobile device may acquire a product identifier image for a given product having an incentive associated therewith and communicate the product identifier image to the promotions server using a short message service short code. The mobile device may also communicate a geographic location and the device ID to the promotions server. The promotions server may assign the incentive to a digital wallet for the purchaser based upon the product identifier image and redeem the incentive based upon the geographic location of the mobile device.

33 Claims, 7 Drawing Sheets

US 10,475,081 B1

COUPON PROCESSING SYSTEM INCLUDING INSTANT REDEEMABLE COUPON REDEMPTION BASED UPON SHORT MESSAGE SERVICE SHORT CODE AND RELATED METHODS

TECHNICAL FIELD

The present invention relates to the field of electronics, and more particularly, to the processing of coupons and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

One type of coupon is an instant redeemable coupon (IRC). An IRC is a physical coupon that is typically attached to a product or near the product at a retail location for the purchaser to use immediately or save for future use. An IRC may be, for example, in the form of a relatively small coupon affixed to the product with an adhesive.

Another type of coupon is a short message service (SMS) digital coupon. A purchaser may opt-in to receive an SMS digital coupon, for example, by sending an opt-in message to a short code. A short code is a shortened telephone number used primarily for mobile marketing. After opting-in, the purchaser may receive a reply SMS message with a digital coupon or coupon code applicable, for example, at a given retailer.

SUMMARY

A coupon processing system may include a promotions server and a mobile wireless communications device associated with a purchaser and having a device identification (ID) associated therewith. The mobile wireless communications device may be configured to acquire a product identifier image for a given product having an incentive associated therewith and communicate the product identifier image to the promotions server using a short message service (SMS) short code. The mobile wireless communications device may also be configured to communicate a geographic location of the mobile wireless communications device to the promotions server, and communicate the device ID to the promotions server. The promotions server may be remote from the retail location and cooperate with the mobile wireless communications device to assign the incentive to a digital wallet for the purchaser based upon the product identifier image and redeem the incentive based upon the geographic location of the mobile wireless communications device.

The incentive may include a instant redeemable coupon (IRC), for example. The coupon processing system may also include a point-of-sale (POS) terminal at a retail location and configured to communicate product data for the given product to the promotions server, and the promotions server may be configured to redeem the incentive based upon the product data. The promotions server may be configured to assign the incentive to the digital wallet based upon the device ID, for example. The retail location may have a loyalty program associated therewith, and the promotions server may be configured to determine whether the purchaser is associated with the loyalty program based upon the device ID.

The promotions server may be configured to cooperate with the mobile wireless communications device to prompt the purchaser to join the loyalty program when the purchaser is not associated with the loyalty program. The promotions server may have a retail location independent loyalty program associated therewith, and the promotions server may be configured to associate the digital wallet with the retail location independent loyalty program based upon the device ID, for example.

The promotions server may be configured to select a loyalty program from among a plurality thereof associated with the retail location based upon the geographic location of the mobile wireless communications device, for example. The promotions server may be configured to redeem the incentive based upon the geographic location of the mobile wireless communications device being adjacent the POS terminal.

The product identifier image may include a universal product code (UPC) image. The device ID may include a telephone number, for example.

A method aspect is directed to a method of processing a coupon using a promotions server remote from a retail location. The method may include using the promotions server to assign an incentive to a digital wallet for a purchaser based upon a product identifier image for a given product having an incentive associated therewith, the purchaser being associated with a mobile wireless communications device having a device identification (ID) and configured to acquire the product identifier image, communicate the product identifier image to the promotions server using a short message service (SMS) short code, communicate a geographic location of the mobile wireless communications device to the promotions server, and communicate the device ID to the promotions server. The method may also include using the promotions server to redeem the incentive based upon the geographic location of the mobile wireless communications device and the product data.

A computer readable medium aspect is directed to non-transitory computer readable medium that includes computer executable instructions that when executed by a processor of a promotions server remote from a retail location to perform operations that may include assigning an incentive to a digital wallet for a purchaser based upon a product identifier image for a given product having an incentive associated therewith, the purchaser being associated with a mobile wireless communications device having a device identification (ID) and configured to acquire the product identifier image, communicate the product identifier image to the promotions server using a short message service (SMS) short code, communicate a geographic location of the mobile wireless communications device to the promotions server, and communicate the device ID to the promotions server. The operations may also include redeeming the incentive based upon the geographic location of the mobile wireless communications device and the product data.

DETAILED DESCRIPTION

Figure 1:
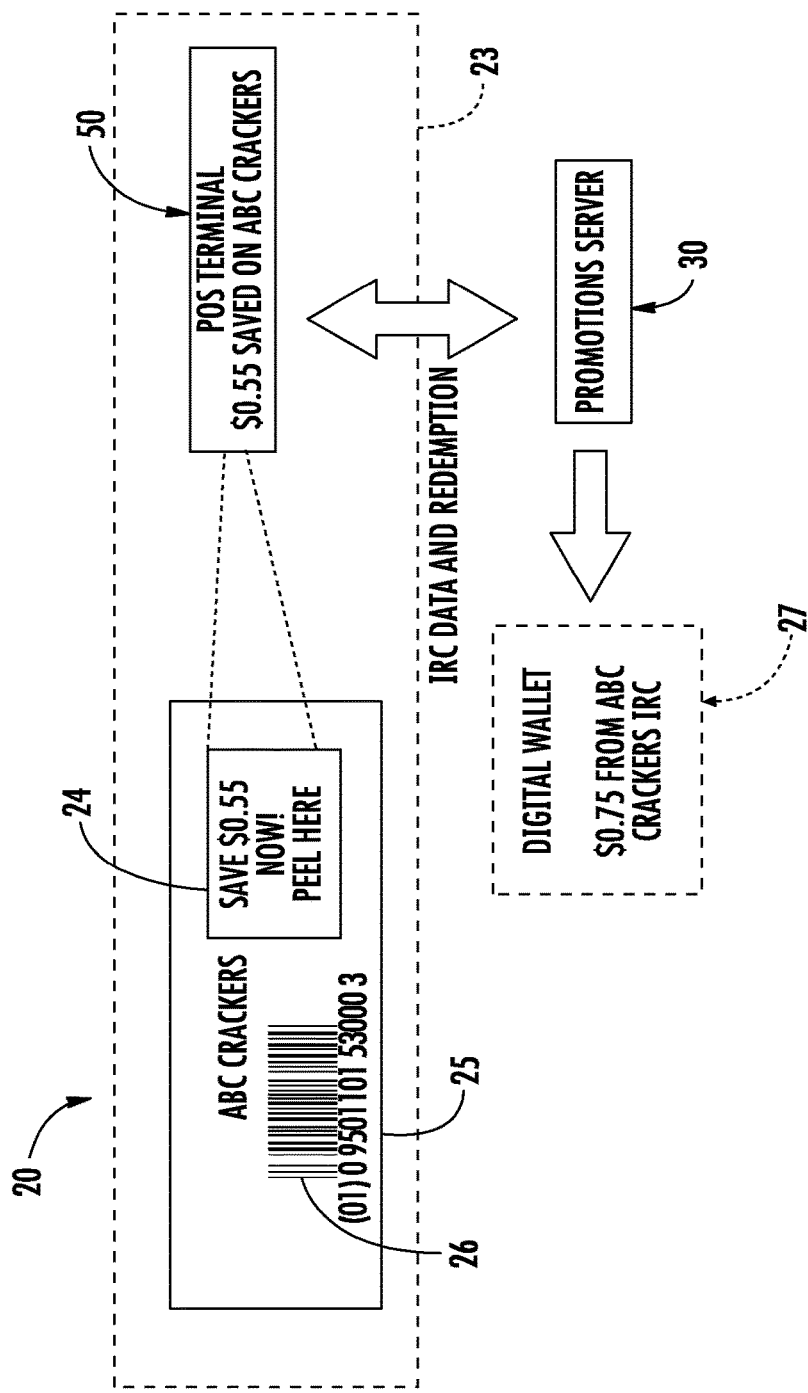
FIG. 1 is a schematic diagram of a coupon processing system according to an embodiment.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and reference numerals in increments of one-hundred are used to indicate similar elements in alternative embodiments.

Figure 2:
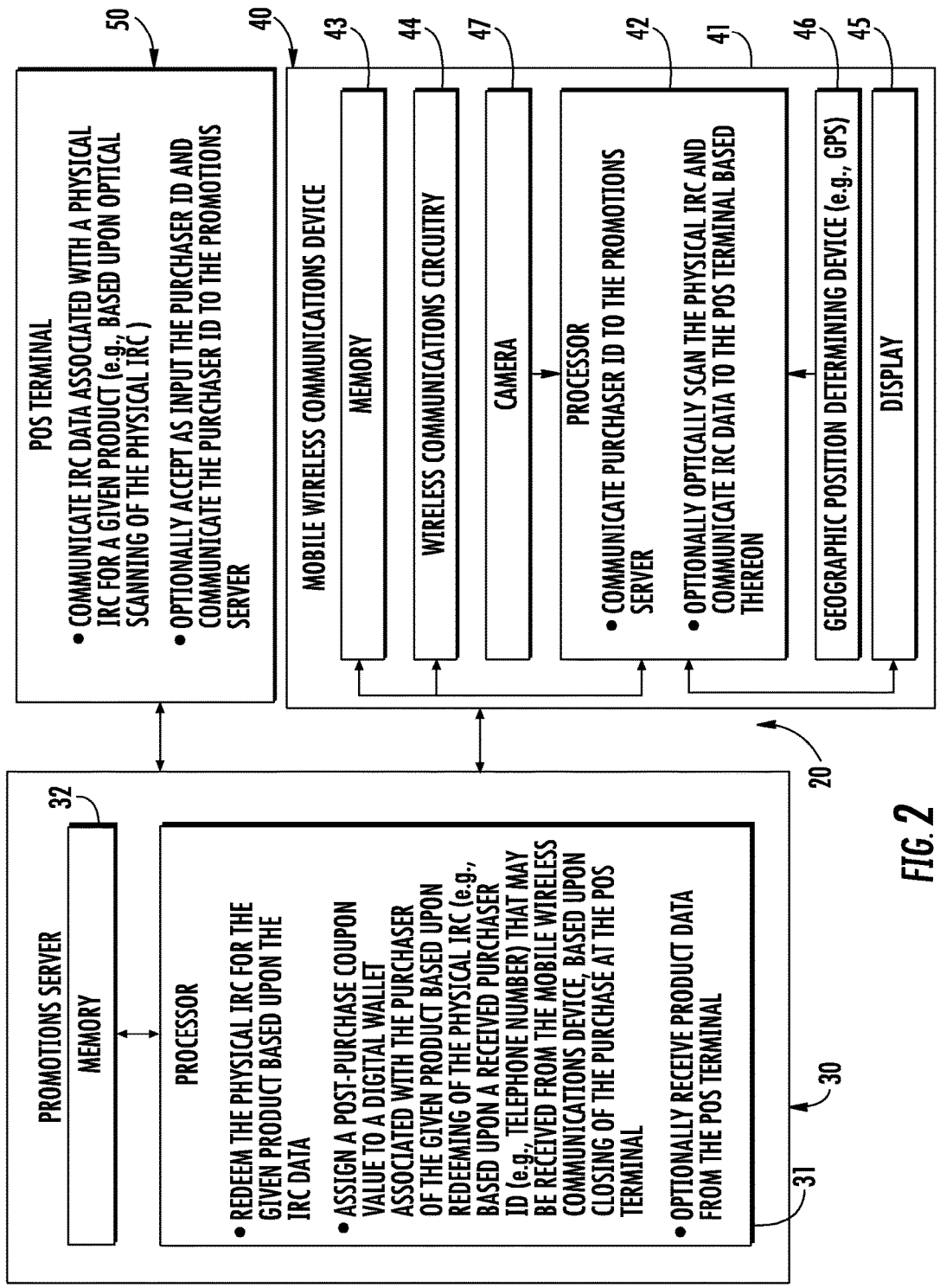
FIG. 2 is a schematic block diagram of the coupon processing system of FIG. 1.

Referring initially to FIGS. 1 and 2, a coupon processing system 20 includes a promotions server 30. The promotions server 30 includes a promotions processor 31 and a promotions memory 32 coupled to the promotions processor. The promotions memory 32 stores promotional offers, for example, associated with a particular product offered at a retail location. Of course, the promotions memory 32 may store other and/or additional types of promotional offers.

The coupon processing system 20 also includes a mobile wireless communications device 40 associated with a purchaser. The mobile wireless communications device 40 illustratively includes a portable housing 41, a mobile device processor 42, a mobile device memory 43 coupled to the mobile device processor, and wireless communications circuitry 44 coupled to the mobile device processor. The mobile wireless communications device 40 also includes a display 45, such as, for example, a touch display, carried by the portable housing 41 and coupled to the mobile device processor 42. The mobile wireless communications device 40 may include one or more input devices, such as for example, a camera 47, and/or other types of output devices.

The mobile wireless communications device 40 may also include a geographic position determining device 46 cooperating with the mobile device processor 42 to communicate a geographic position of the mobile wireless communications device to the promotions server 30. The geographic position determining device 46 may be a global positioning system (GPS) device. The mobile wireless communications device 40 may be a mobile phone or smartphone, a table computer, or other type of mobile wireless communications device, as will be appreciated by those skilled in the art.

The coupon processing system 20 also includes a point-of-sale (POS) terminal 50 located at a retail location 23. The POS terminal 50 may be remote from the promotions server 30, for example. The POS terminal 50 may include a payment card reader which may be in the form of a magnetic card reader, optical card reader, and/or a touchless, e.g., near-field communication (NFC) card reader.

Figure 3:
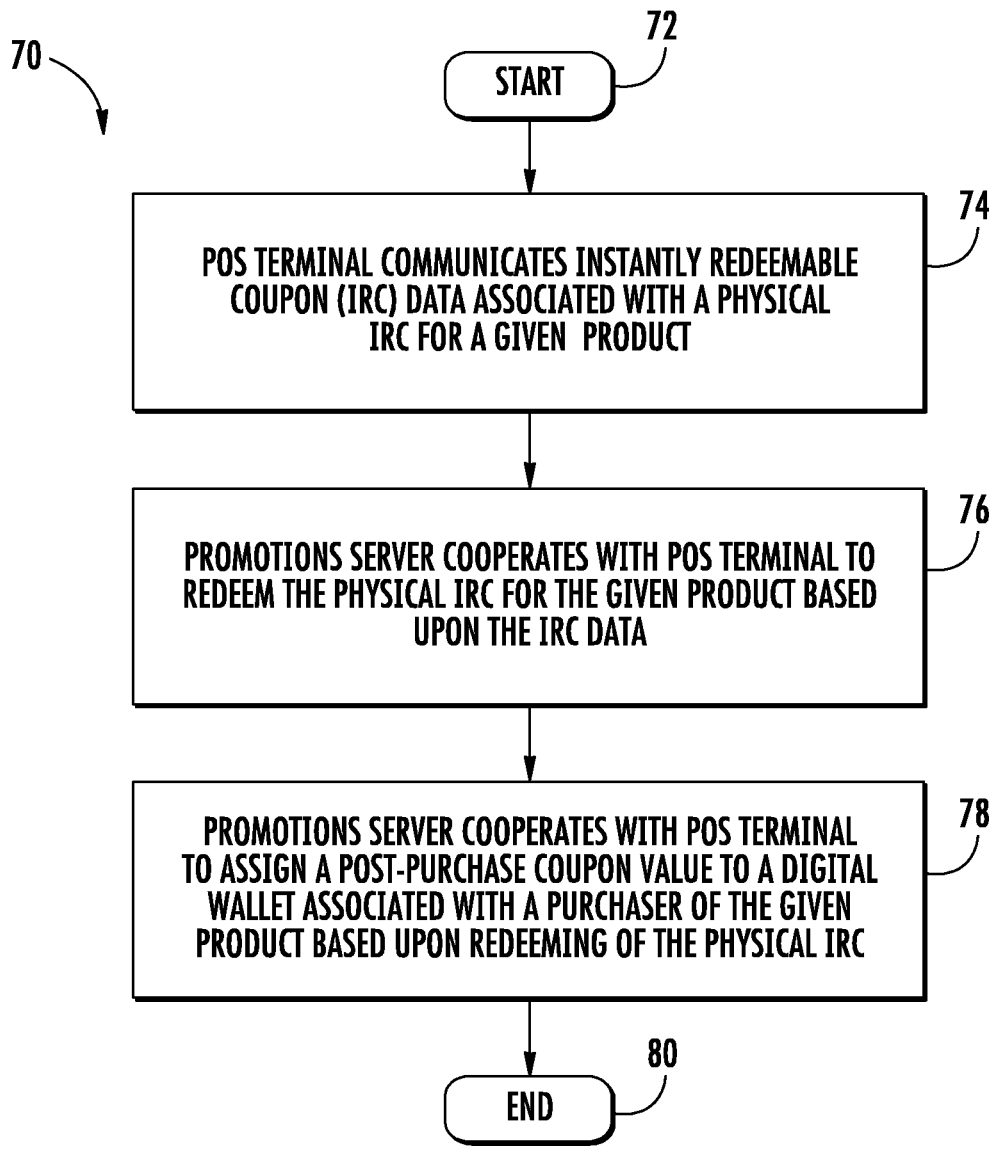
FIG. 3 is a flowchart of operation of the coupon processing system of FIG. 1.

Referring now additionally to the flowchart 70 in FIG. 3, and beginning at Block 72, operation of the coupon processing system 20 will now be described. At Block 74, the POS terminal 50, communicates instant redeemable coupon (IRC) data associated with a physical IRC 24 for a given product 25. As will be appreciated by those skilled in the art, an IRC is a physical coupon (i.e., not digital) that is typically attached to a product or near the product at a retail location for the purchaser to use immediately or save for future use. An IRC may be, for example, in the form of a relatively small paper or plastic coupon affixed to the product with an adhesive. An IRC may also be in the form of a "sticky" pad which may be affixed to a shelf adjacent the product at the retail location. Other types of IRCs may include IRC coupon dispensers and direct-printed product packaging coupons, for example. Of course, there may be other types of an IRC. Additionally, the IRC may not be redeemable toward the product to which it may be affixed, but rather a companion product, for example.

Figure 4:
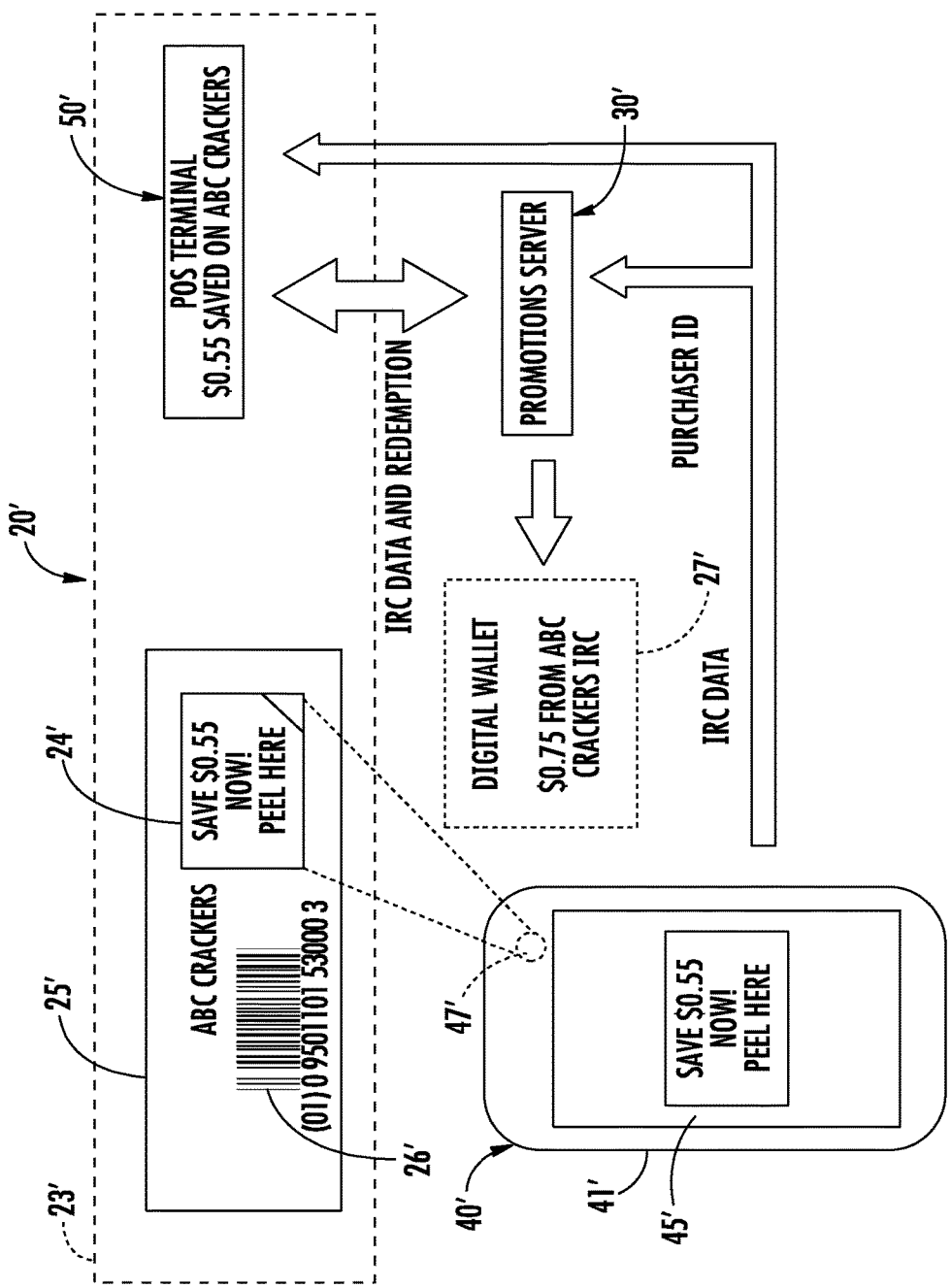
FIG. 4 is a schematic diagram of a coupon processing system according to another embodiment.

The POS terminal 50 may acquire the IRC data by optically scanning the physical IRC 24 (e.g., the IRC barcode). The IRC data may be acquired by physical entry of IRC identifying data (i.e., keying-in). IRC data may include a product identifier, coupon value, coupon expiration date, etc. Of course, other and/or additional types of data may be included in the communicated IRC data. Referring briefly to FIG. 4, in another embodiment, the mobile wireless communications device 40' may optically scan, for example, using the camera 47', the physical IRC 24' and communicate the IRC data to the POS terminal 50'.

Returning to FIGS. 1-3, at Block 76, the promotions server 30, which is remote from the retail location 23, cooperates with the POS terminal 50 to redeem the physical IRC 24 for the given product 25 based upon the IRC data. In other words, the IRC is applied to the purchase as a coupon or discount. The promotions server 30 may verify that the given product 25 is in fact being purchased based upon product data received from the POS terminal 50. As will be appreciated by those skilled in the art, the POS terminal 50 may send product data or information, which may include product identifiers such as UPCs 26, to the promotions server 30 on a per product or per-scan basis, or after at the end of the scanning just prior to closing the transaction. This way, the promotions server 30 has basket level data or product identifiers for all products being purchased during the transaction.

At Block 78, the promotions server 30 assigns a post-purchase coupon value to a digital wallet 27 associated with a purchaser of the given product based upon redeeming of the physical IRC 24. In other words, the promotions server 30 may deposit, for example, a value (e.g., $0.75) to the digital wallet 27 of the purchaser when the purchaser redeems the physical IRC 24 (i.e., post purchase and/or upon closing of the purchase at the POS terminal 50). The digital wallet 27 may be stored in the memory 32 of the promotions server 30 and/or stored in the mobile device memory 43. Of course, the digital wallet 27 may be stored elsewhere, for example, in a remote server.

The post-purchase coupon value may be assigned to the digital wallet 27 based upon a purchaser identifier (ID). The purchaser ID may be communicated from the mobile wireless communications device 40 and received at the promotions server 30. The purchaser ID may include a telephone number associated with the purchaser and/or mobile wireless communications device 40. As will be appreciated by those skilled in the art, a telephone number may often be used to access a loyalty program or other account associated with a digital wallet and/or loyalty program both retailer specific and across multiple retailers.

In other embodiments, the purchaser ID may be input by the purchaser, for example, at the POS terminal 50. In other words, the purchaser may enter his or her telephone number as the purchaser ID at the POS terminal 50, and the post-purchase coupon value may be assigned to the digital wallet 27 based thereon. The method ends at Block 80.

As will be appreciated by those skilled in the art, the redemption rate of an IRC may be about 35%, which may be considered a relatively high redemption rate relative to other types of coupons. However, paper or physical coupons, such as an IRC, may have increased costs to process after redemption. Thus, it may be desirable to redeem digital coupons. A purchaser may be biased toward a paper coupon, such as an IRC, and thus the likelihood of an IRC user using a digital coupon may be relatively low. Offering a post-purchase digital coupon may entice or gradually persuade a purchaser to move to and/or be more comfortable with a digital coupon or digital wallet having value, for example, having a post purchase value to be used toward a future purchase.

A computer readable medium aspect is directed to a non-transitory computer readable medium that includes computer executable instructions that cause the processor 31 of the promotions server 30 to perform operations that include redeeming a physical IRC 24 for a given product based upon IRC data associated with the physical IRC, the IRC data being received from a POS terminal 50 at the retail location, and assigning a post-purchase coupon value to a digital wallet 27 associated with a purchaser of the given product based upon redeeming of the physical IRC.

Figure 5:
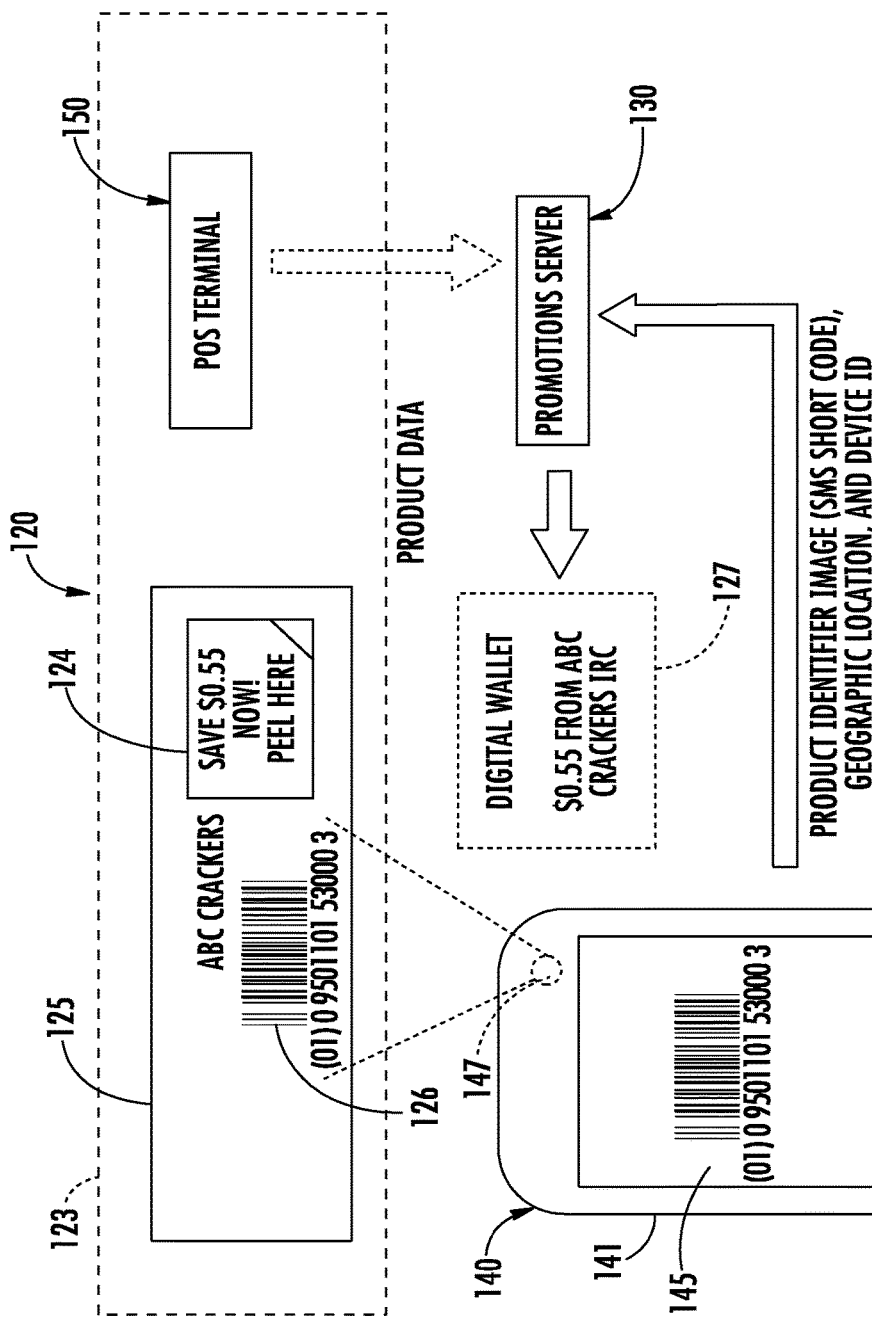
FIG. 5 is a schematic diagram of a coupon processing system according to another embodiment.
Figure 6:
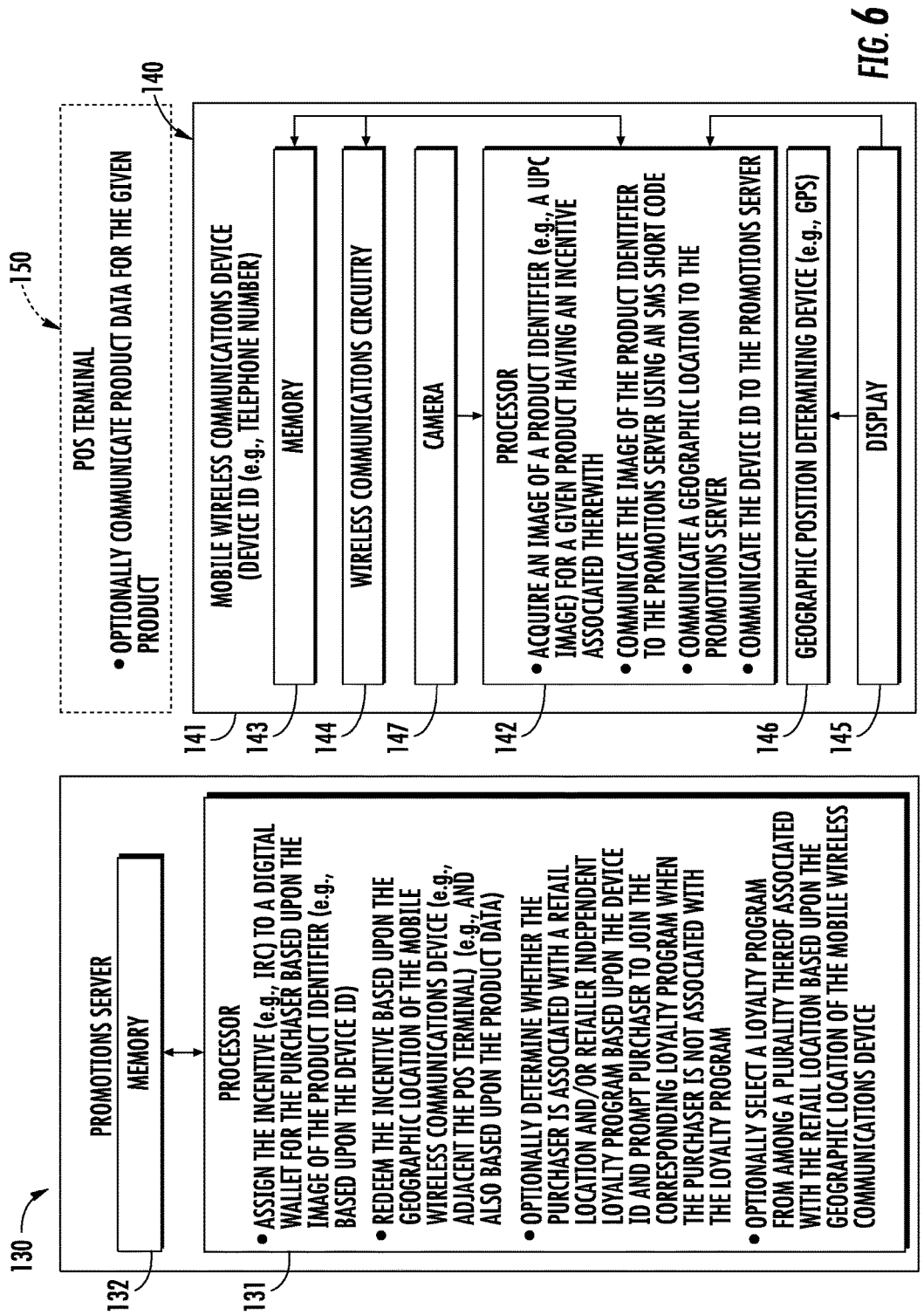
FIG. 6 is a schematic block diagram of the coupon processing system of FIG. 5.

Referring now to FIGS. 5-6, in another embodiment, a coupon processing system 120 includes a promotions server 130. The promotions server 130 includes a promotions processor 131 and a promotions memory 132 coupled to the promotions processor. The promotions memory 132 stores promotional offers, for example, associated with a particular product offered at a retail location. Of course, the promotions memory 132 may store other and/or additional types of promotional offers.

The coupon processing system 120 also includes a mobile wireless communications device 140 associated with a purchaser. The mobile wireless communications device 140 has a device identifier (ID) associated therewith, for example, a telephone number associated with the mobile wireless communications device. The mobile wireless communications device 140 illustratively includes a portable housing 141, a mobile device processor 142, a mobile device memory 143 coupled to the mobile device processor, and wireless communications circuitry 144 coupled to the mobile device processor. The mobile wireless communications device 140 also includes a display 145, such as, for example, a touch display, carried by the portable housing 141 and coupled to the mobile device processor 142. The mobile wireless communications device 140 may include one or more input devices, such as, for example, a camera 147, and/or other types of output devices.

The mobile wireless communications device 140 may also include a geographic position determining device 146 cooperating with the mobile device processor 142 to communicate a geographic position of the mobile wireless communications device to the promotions server 130. The geographic position determining device 146 may be a global positioning system (GPS) device. The mobile wireless communications device 140 may be a mobile phone or smartphone, a table computer, or other type of mobile wireless communications device, as will be appreciated by those skilled in the art.

The coupon processing system 120 also includes a point-of-sale (POS) terminal 150 located at a retail location 123. The POS terminal 150 may be remote from the promotions server 130, for example. The POS terminal 150 may include a payment card reader which may be in the form of a magnetic card reader, optical card reader, and/or a touchless, e.g., near-field communication (NFC) card reader.

Figure 7:
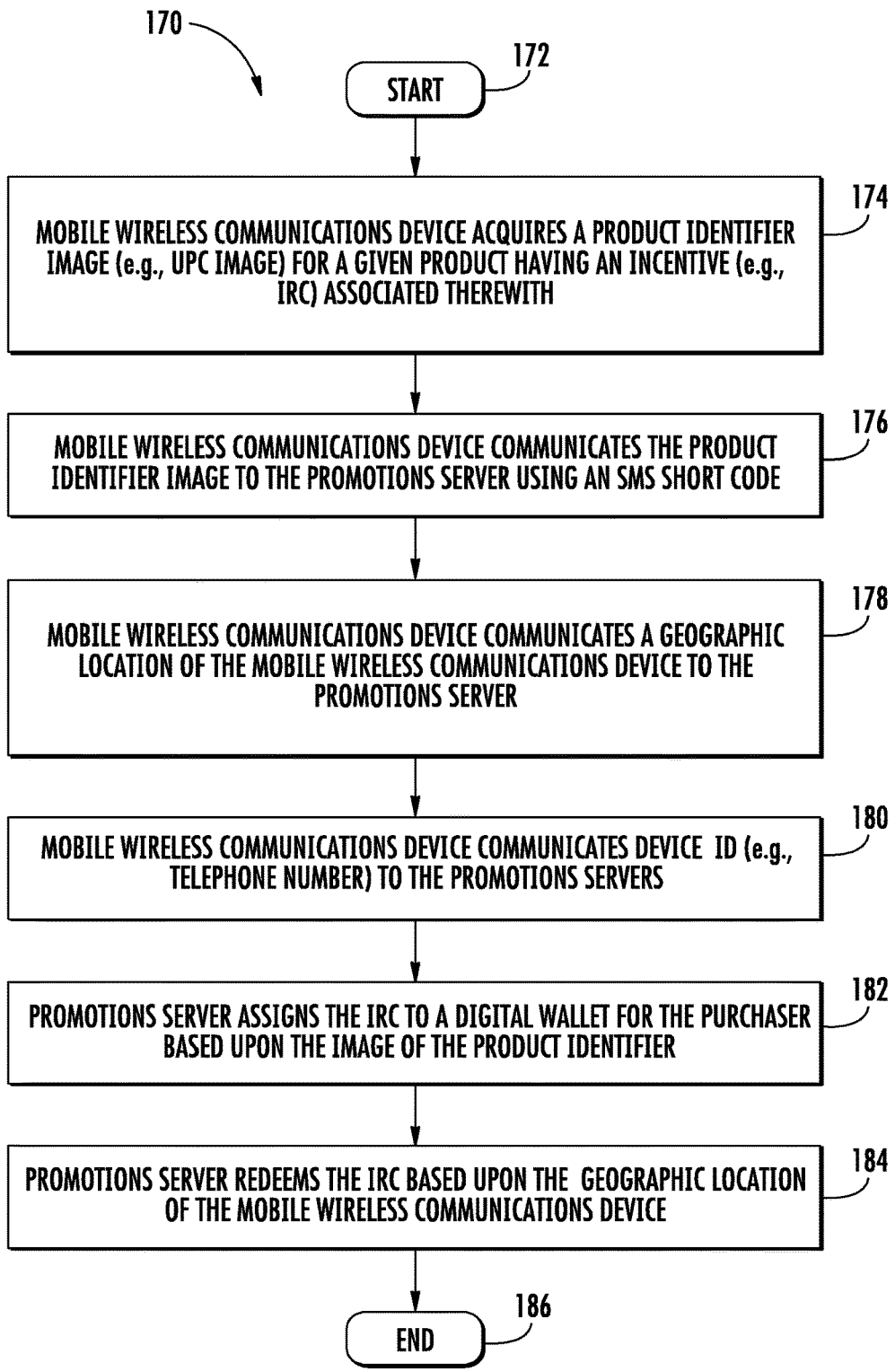
FIG. 7 is a flowchart of operation of the coupon processing system of FIG. 5.

Referring now additionally to the flowchart 170 in FIG. 7, and beginning at Block 172, operation of the coupon processing system 120 will now be described. At Block 174, the mobile wireless communications device acquires a product identifier image, for example, an image of a universal product code (UPC) 126 for a given product having an incentive, illustratively in the form of an IRC 124 (FIG. 5), associated therewith, for example. While an IRC is described, the incentive may be any type of coupon or a rebate. Of course, the product identifier 126 may be a different type of product identifier, for example, image of the product packaging, an advertisement, an on-package message, etc. As will be appreciated by those skilled in the art, an IRC is a physical coupon (i.e., not digital) that is typically attached to a product or near the product at a retail location 123 for the purchaser to use immediately or save for future use. An IRC may be, for example, in the form of a relatively small paper or plastic coupon affixed to the product with an adhesive. An IRC may also be in the form of a "sticky" pad which may be affixed to a shelf adjacent the product at the retail location.

At Block 176, the mobile wireless communications device 140 communicates the product identifier 126 image to the promotions server 130 using a short message service (SMS) short code. As will be appreciated by those skilled in the art, a short code is a shortened telephone number that may be used for mobile marketing.

At Block 178, the mobile wireless communications device 140 communicates a geographic location of the mobile wireless communications device to the promotions server 130, for example, as determined based upon the geographic position determining device 146. In some embodiments, the geographic location of the mobile wireless communications device 140 may be determined based upon other and/or additional information, for example, based upon triangulation, network identifiers, etc.

The mobile wireless communications device 140 communicates, at Block 180, the device ID to the promotions server 130. At Block 182, the promotions server 130, which is remote from the retail location 123 and cooperates with mobile wireless communications device 140, assigns the IRC 124 to a digital wallet 127 for the purchaser based upon the product identifier image. Of course, in embodiments where the incentive is not an IRC, the appropriate incentive (e.g., digital coupon or rebate) may be assigned to the digital wallet 124. The digital wallet 127 may be associated with a particular retail location loyalty program, a retail location independent loyalty program, or both a retail location and retail location independent loyalty program. Still in other embodiments, the digital wallet 127 may not be associated with any loyalty program (i.e., a standalone digital wallet).

If the retail location has or offers a retail location loyalty program, for example, and the purchaser is not associated with the loyalty program, the promotions server 130 may cooperate with the mobile wireless communications device 140 to prompt the purchaser to join the loyalty program. The prompt may be displayed on the display 145 of the mobile wireless communications device 140, for example.

The promotions server 130 may assign the IRC 124 to a corresponding digital wallet 127 based upon the device ID. In other words, the corresponding digital wallet 127 may be determined or assigned based upon the device ID, which in turn may be used to sign into or a retail location and/or retail location independent loyalty program if associated with the purchaser. The digital wallet 127 may be stored in the memory 132 of the promotions server 130 and/or stored in the mobile device memory 143. Of course, the digital wallet 127 may be stored elsewhere, for example, in a remote server.

The promotions sever 130, at Block 184, redeems the IRC 124 based upon the geographic location of the mobile wireless communications device 140. More particularly, when the promotions server 130 determines that the mobile wireless communications device 140 is at the retail location 123 and/or adjacent the POS terminal 150, the IRC 124 is redeemed, for example, as a mobile rebate. In other words, the IRC 124 is applied to the purchase as a coupon or discount. Other and/or additional promotions, for example, stored in the digital wallet may be redeemed at the retail location based upon access to the retailer location loyalty program. The redemption may occur regardless of whether the retailer has a retail location loyalty program associated therewith.

When, for example, the retailer is associated with the promotions server 130 or has a loyalty program hosted by or cooperating with the promotions server, the POS terminal 150, communicates product data for the given product to the promotions server. Similar to the product identifier 126, the product data may include product identifiers, such as, for example, UPCs. The product data may be communicated to the promotions server 130 on a per product or per-scan basis, or after at the end of the scanning just prior to closing the transaction. This way, the promotions server 130 has basket level data or product identifier for all products being purchased during the transaction. The promotions server 130 may verify that the given product is in fact being purchased based upon the product data received from the POS terminal 150 and then redeem the IRC 124 also based upon the product data.

Additionally, for example, where the promotions server 130 may be associated with or hosts multiple loyalty programs (e.g., for various retail locations), and where the purchaser is also associated with multiple loyalty programs, the promotions server may select the appropriate loyalty program. The promotions server 130 may select the given loyalty program based upon the geographic location of the mobile wireless communications device 140. More particularly, if the purchaser is a participant in several retailer location based loyalty programs, the promotions server 130 may determine which loyalty program to choose based upon the location of the mobile wireless communications device 140 and for both assignment and redemption of the IRC 124. The method ends at Block 186.

A computer-readable medium aspect is directed to a non-transitory computer readable medium that when executed by the processor 131 of the promotions server 130 causes the processor to perform operations. The operations include assigning the incentive 124 to a digital wallet 127 for the purchaser based upon the product identifier image and redeeming the incentive based upon the geographic location of the mobile wireless communications device 140, wherein the product identifier image is acquired by the mobile wireless communications device, and communicated to the promotions server using an SMS short code, and wherein the geographic location is also communicated to the promotions server from the mobile wireless communications device.

The coupon processing system 120 may be particularly useful for reducing the amount of paper coupon processing. For example, instead of "scanning" an IRC at a POS terminal, the purchaser may simply acquire an image of the IRC, for example, by way of a camera, for redemption. This may increase processing speed of the checkout process including speed of and at the POS terminal 150 by reducing the amount of data to be processed therethrough. In particular, the IRC 124 is not processed through the POS terminal 150, but rather through the mobile wireless communications device 140.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A coupon processing system comprising:
 a promotions server; and a mobile wireless communications device associated with a purchaser and having a device identification (ID) associated therewith, said mobile wireless communications device for
 acquiring a product identifier image for a given product having a physical coupon associated therewith,
 communicating the product identifier image to said promotions server using a short message service (SMS) short code,
 communicating a geographic location of the mobile wireless communications device to said promotions server, and
 communicating the device ID to said promotions server;
 said promotions server being remote from the retail location and cooperating with said mobile wireless communications device to
 assign the physical coupon to a digital wallet for the purchaser based upon the product identifier image, and
 redeem the physical coupon based upon the geographic location of said mobile wireless communications device.

2. The coupon processing system of claim 1 wherein the physical coupon comprises an instant redeemable coupon (IRC).

3. The coupon processing system of claim 1 further comprising a point-of-sale (POS) terminal at a retail location for communicating product data for the given product to said promotions server; and wherein said promotion server cooperates with said POS terminal to redeem the physical coupon based upon the product data.

4. The coupon processing system of claim 1 wherein said promotions server is for assigning the physical coupon to the digital wallet based upon the device ID.

5. The coupon processing system of claim 1 wherein the retail location has a loyalty program associated therewith; and wherein said promotions server is for determining whether the purchaser is associated with the loyalty program based upon the device ID.

6. The coupon processing system of claim 5 wherein said promotions server is for cooperating with said mobile wireless communications device to prompt the purchaser to join the loyalty program when the purchaser is not associated with the loyalty program.

7. The coupon processing system of claim 1 wherein said promotions server has a retail location independent loyalty program associated therewith; and
wherein said promotions server is for associating the digital wallet with the retail location independent loyalty program based upon the device ID.

8. The coupon processing system of claim 1 wherein said promotions server is for selecting a loyalty program from among a plurality thereof associated with the retail location based upon the geographic location of said mobile wireless communications device.

9. The coupon processing system of claim 1 wherein said promotions server is for redeeming the physical coupon based upon the geographic location of said mobile wireless communications device being adjacent said POS terminal.

10. The coupon processing system of claim 1 wherein the product identifier image comprises a universal product code (UPC) image.

11. The coupon processing system of claim 1 wherein the device ID comprises a telephone number.

12. A promotions server remote from a retail location and comprising:
a memory; and
a processor cooperating with said memory to assign a physical coupon to a digital wallet for a purchaser based upon a product identifier image for a given product having the physical coupon associated therewith, the purchaser being associated with a mobile wireless communications device having a device identification (ID) and for acquiring the product identifier image, communicating the product identifier image to the promotions server using a short message service (SMS) short code, communicating a geographic location of the mobile wireless communications device to the promotions server, and communicating the device ID to the promotions server, and
redeem the physical coupon based upon the geographic location of said mobile wireless communications device.

13. The promotions server of claim 12 wherein the physical coupon comprises an instant redeemable coupon (IRC).

14. The promotions server of claim 12 wherein said processor is for redeeming the physical coupon based upon product data received from a point-of-sale (POS) terminal for the given product.

15. The promotions server of claim 12 wherein said processor is for assigning the physical coupon to the digital wallet based upon the device ID.

16. The promotions server of claim 12 wherein the retail location has a loyalty program associated therewith; and wherein said processor is for determining whether the purchaser is associated with the loyalty program based upon the device ID.

17. The promotions server of claim 16 wherein said processor is for cooperating with the mobile wireless communications device to prompt the purchaser to join the loyalty program when the purchaser is not associated with the loyalty program.

18. The promotions server of claim 12 wherein said processor has a retail location independent loyalty program associated therewith; and wherein said processor is for associating the digital wallet with the retail location independent loyalty program based upon the device ID.

19. The promotions server of claim 12 wherein said processor is for selecting a loyalty program from among a plurality thereof associated with the retail location based upon the geographic location of the mobile wireless communications device.

20. The promotions server of claim 12 wherein said processor is for redeeming the physical coupon based upon the geographic location of said mobile wireless communications device being adjacent the POS terminal.

21. A method of processing a coupon using a promotions server remote from a retail location, the method comprising:
using the promotions server to assign a physical coupon to a digital wallet for a purchaser based upon a product identifier image for a given product having the physical coupon associated therewith, the purchaser being associated with a mobile wireless communications device having a device identification (ID) for acquiring the product identifier image, communicate the product identifier image to the promotions server using a short message service (SMS) short code, communicate a geographic location of the mobile wireless communications device to the promotions server, and communicate the device ID to the promotions server, and
redeem the physical coupon based upon the geographic location of the mobile wireless communications device and the product data.

22. The method of claim 21 wherein the physical coupon comprises an instant redeemable coupon (IRC).

23. The method of claim 21 wherein the promotions server is used to redeem the physical coupon based upon product data received from a point-of-sale (POS) terminal for the given product.

24. The method of claim 21 wherein the promotions server is used to assign the physical coupon to the digital wallet based upon the device ID.

25. The method of claim 21 wherein the retail location has a loyalty program associated therewith; and wherein the promotions server is used to determine whether the purchaser is associated with the loyalty program based upon the device ID.

26. The method of claim 25 wherein the promotions server is used to cooperate with the mobile wireless communications device to prompt the purchaser to join the loyalty program when the purchaser is not associated with the loyalty program.

27. The method of claim 21 wherein the promotions server has a retail location independent loyalty program associated therewith; and wherein the promotions server is used to associate the digital wallet with the retail location independent loyalty program based upon the device ID.

28. A non-transitory computer readable medium comprising computer executable instructions that when executed by a processor of a promotions server remote from a retail location cause the processor to perform operations comprising:
assigning a physical coupon to a digital wallet for a purchaser based upon a product identifier image for a given product having the physical coupon associated therewith, the purchaser being associated with a mobile wireless communications device having a device identification (ID) for acquiring the product identifier image, communicate the product identifier image to the promotions server using a short message service (SMS) short code, communicate a geographic location of the mobile wireless communications device to the promotions server, and communicate the device ID to the promotions server; and redeeming the physical coupon based upon the geographic location of the mobile wireless communications device.

29. The non-transitory computer readable medium of claim 28 wherein the physical coupon comprises an instant redeemable coupon (IRC).

30. The non-transitory computer readable medium of claim 28 wherein the operations comprise redeeming the physical coupon based upon product data received from a point-of-sale (POS) terminal for the given product.

31. The non-transitory computer readable medium of claim 28 wherein the operations comprise assigning the physical coupon to the digital wallet based upon the device ID.

32. The non-transitory computer readable medium of claim 28 wherein the retail location has a loyalty program associated therewith; and wherein the operations comprise determining whether the purchaser is associated with the loyalty program based upon the device ID.

33. The non-transitory computer readable medium of claim 28 wherein the promotions server has a retail location independent loyalty program associated therewith; and wherein the operations comprise associating the digital wallet with the retail location independent loyalty program based upon the device ID.

* * * * *